(12) United States Patent
Watts

(10) Patent No.: US 8,366,053 B2
(45) Date of Patent: Feb. 5, 2013

(54) SYSTEM AND METHOD FOR DEPLOYING PAYLOADS WITH A LAUNCH VEHICLE

(75) Inventor: Keith Peter Watts, Rolling Hills Estates, CA (US)

(73) Assignee: The Boeing Company, Chicago, IL (US)

(*) Notice: Subject to any disclaimer, the term of this patent is extended or adjusted under 35 U.S.C. 154(b) by 1035 days.

(21) Appl. No.: 12/043,859

(22) Filed: Mar. 6, 2008

(65) Prior Publication Data

US 2009/0224106 A1  Sep. 10, 2009

(51) Int. Cl.
*B64G 1/64* (2006.01)
(52) U.S. Cl. .................. 244/173.3; 244/158.1
(58) Field of Classification Search ............... 244/173.1, 244/173.3
See application file for complete search history.

(56) References Cited

U.S. PATENT DOCUMENTS

| | | | | |
|---|---|---|---|---|
| 3,314,531 | A * | 4/1967 | Cheris et al. | 206/758 |
| 5,411,226 | A * | 5/1995 | Jones et al. | 244/173.3 |
| 6,276,639 | B1 * | 8/2001 | Hornung et al. | 244/173.3 |
| 7,118,077 | B1 * | 10/2006 | Kistler et al. | 244/173.1 |

OTHER PUBLICATIONS

Ariane5 User's Manual; Issue 4, Revision 0; Arianspace; Nov. 2004; pp. 1-49.
Factsheet—NASA Stereo; NASA Science Mission Directorate, Washington, D.C.; http://www.nasa.gov/stereo; rev. Oct. 2006.

* cited by examiner

*Primary Examiner* — Tien Dinh
*Assistant Examiner* — Michael Kreiner
(74) *Attorney, Agent, or Firm* — Armstrong Teasdale LLP

(57) ABSTRACT

A system for deploying a plurality of independent payloads with a launch vehicle, the launch vehicle being longitudinally oriented about an axis, includes a plurality of launch modules. Each respective launch module of the plurality of launch modules includes a plurality of package elements. A respective predetermined set of package elements of the plurality of package elements comprises a respective payload of the plurality of payloads. Each respective launch module of the plurality of launch modules is situated in an abuttingly supporting relation with at least one adjacent launch module in a facing relation at an interface in a launch orientation. The interface is generally parallel with the axis. At least one restraining member cooperates with the plurality of launch modules to effect compressingly maintaining the plurality of launch modules in the launch orientation.

18 Claims, 6 Drawing Sheets

US 8,366,053 B2

SYSTEM AND METHOD FOR DEPLOYING PAYLOADS WITH A LAUNCH VEHICLE

This invention was made with Government support under Contract Number FA8807-04-C0002, awarded by the Air Force. The Government has certain rights in this invention.

FIELD

The present disclosure is directed to space craft, and especially to launching a plurality of space craft with a single launch vehicle.

BACKGROUND

Launching space craft such as, by way of example and not by way of limitation, satellites or other craft for effecting for space travel may be expensive. It may be cost effective to launch more than one space craft using a single launch vehicle. Some attempts have been made to launch two satellites with a single rocket vehicle, but the two satellites were affixed atop the rocket vehicle using a specialized framework. The framework may add considerable weight to the payload that must be lifted into space without contributing benefit to the mission.

One example of such a framework may be illustrated by a structure originally employed by French racketeers using the Ariane rocket vehicle. The framework was dubbed SPELTRA (Structure Porteuse Externe Lancement Triple Ariane), weighed approximately 2000 pounds and fixed two payloads atop one another generally oriented about a longitudinal axis of the rocket vehicle along which the rocket vehicle's flight path lay.

There is a need for a system and method for deploying payloads with a launch vehicle that does not contribute significant non-mission benefiting weight to the payload.

SUMMARY

A system for deploying a plurality of independent payloads with a launch vehicle, the launch vehicle being longitudinally oriented about an axis, includes a plurality of launch modules. Each respective launch module of the plurality of launch modules includes a plurality of package elements. A respective predetermined set of package elements of the plurality of package elements comprises a respective payload of the plurality of payloads. Each respective launch module of the plurality of launch modules is situated in an abuttingly supporting relation with at least one adjacent launch module in a facing relation at an interface in a launch orientation. The interface is generally parallel with the axis. At least one restraining member cooperates with the plurality of launch modules to effect compressingly maintaining the plurality of launch modules in the launch orientation.

A method for deploying a plurality of independent payloads with a launch vehicle, the launch vehicle being longitudinally oriented about an axis, includes: (a) in no particular order: (1) providing a plurality of launch modules; each respective launch module of the plurality of launch modules including a plurality of package elements; a respective predetermined set of package elements of the plurality of package elements comprising a respective payload of the plurality of payloads; and (2) providing at least one restraining member; (b) arranging each respective launch module of the plurality of launch modules in an abuttingly supporting relation with at least one adjacent launch module in a facing relation at an interface in a launch orientation; the interface being generally parallel with the axis; and (c) installing the at least one restraining member for cooperating with the plurality of launch modules to effect compressingly maintaining the plurality of launch modules in the launch orientation.

It is, therefore, a feature of the present disclosure to provide a system and method for deploying payloads with a launch vehicle that does not contribute significant weight to the payload.

Further objects and features of the present disclosure will be apparent from the following specification and claims when considered in connection with the accompanying drawings, in which like elements are labeled using like reference numerals in the various figures, illustrating the preferred embodiments of the disclosure.

DETAILED DESCRIPTION

Figure 1:
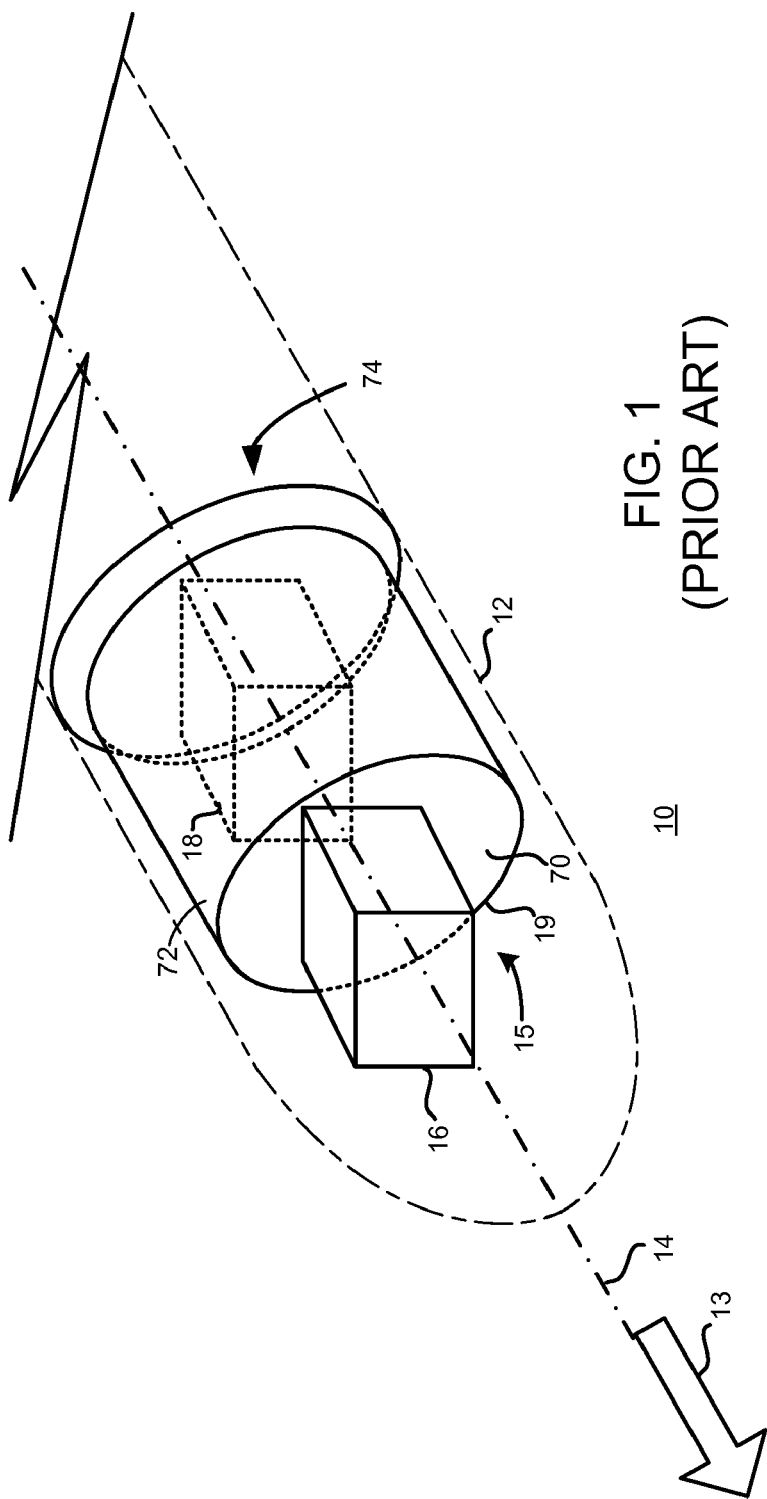
FIG. 1 is a schematic diagram of a prior art arrangement for a two-unit payload carried in a single launch vehicle.

FIG. 1 is a schematic diagram of a prior art arrangement for a two-unit payload carried in a single launch vehicle. In FIG. 1, a prior art payload configuring system 10 may be deployed within a leading or nose fairing structure 12 of a launch vehicle such as a rocket or missile (not shown in its entirety in FIG. 1). Nose fairing structure 12 may be oriented about a longitudinal axis 14. Nose fairing structure 12 is indicated in broken line format in FIG. 1 so as to permit emphasis on payload configuring system 10. Axis 14 may be oriented generally along the intended flight path (indicated by an arrow 13) of the launch vehicle bearing nose fairing structure 12.

A payload 15 may include launch packages 16, 18. Launch packages 16, 18 may each be arranged substantially about axis 14 in an end-to-end orientation. A multi-package carrying structure 19 may be employed for holding launch packages 16, 18 in place. Multi-package carrying structure 19 may be configured as a generally hollow generally cylindrical structure having a top plate 70 coupled with a substantially cylindrical wall 72. Launch package 16 may be affixed with top plate 70. Launch package 18 may be affixed within a cavity 74 established by cooperation of top plate 70 and cylindrical wall 72. Details of affixing of launch package 18 within cavity 74 are not illustrated in FIG. 1. Multi-package carrying structure 19 may be coupled with the launch vehicle bearing nose fairing structure 12. Multi-package carrying structure 19 may be employed as a portion of nose fairing structure (not shown in FIG. 1).

Figure 2:
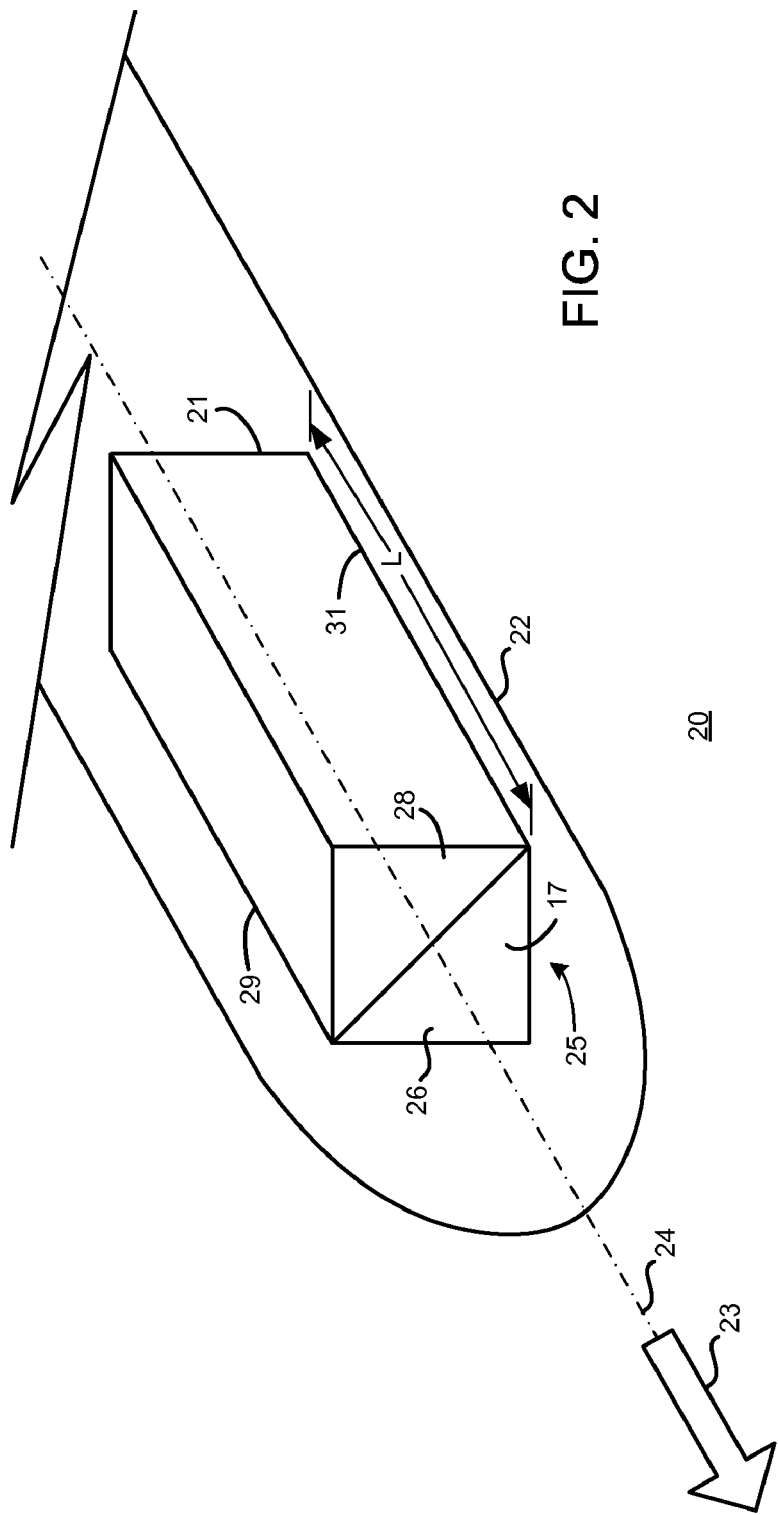
FIG. 2 is a schematic diagram of a two-unit payload carried in a single launch vehicle according to the teachings of the present disclosure.

FIG. 2 is a schematic diagram of a two-unit payload carried in a single launch vehicle according to the teachings of the present disclosure. In FIG. 2, a payload configuring system 20 may be deployed within a leading or nose fairing structure 22 of a launch vehicle such as a rocket or missile (not shown in its entirety in FIG. 2). Nose fairing structure 22 may be oriented about a longitudinal axis 24. Axis 24 may be oriented generally along the intended flight path (indicated by an arrow 23) of the launch vehicle bearing nose fairing structure 22.

A payload 25 may include launch packages 26, 28. Launch packages 26, 28 may each be arranged substantially adjacent to axis 24 in a side-by-side generally abreast orientation establishing payload 25 oriented substantially about axis 24. Payload 25 may present substantially linear junctures 29, 31 extending from a leading end 17 to a trailing end 21 along a length L.

Payload 25 may include more than two launch packages. If more than two launch packages are included in payload 25, then the shape of respective launch packages may be altered to present interfaces between adjacent launch packages generally oriented parallel with axis 24.

Figure 3:
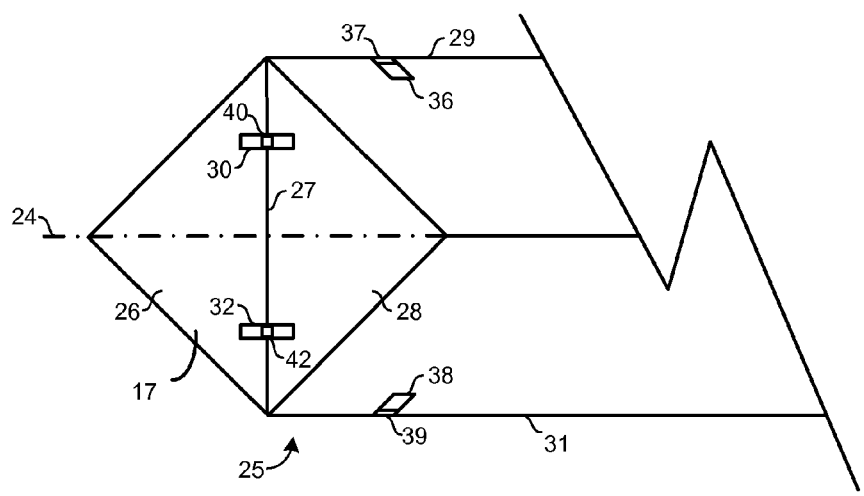
FIG. 3 is a detailed schematic diagram of the leading end of the two-unit payload illustrated in FIG. 2.

FIG. 3 is a detailed schematic diagram of the leading end of the two-unit payload illustrated in FIG. 2. In FIG. 3, payload 25 is viewed from leading end 17 and may include launch packages 26, 28 arranged substantially adjacent to axis 24 in a side-by-side generally abreast orientation. Strap members 30, 32 may be engaged with launch packages 26, 28 in an orientation straddling an interface 27 between launch packages 26, 28. Strap members 30, 32 may interact with launch packages 26, 28 to abuttingly hold launch packages 26, 28 in a substantially facing relation at interface 27. Strap members 30, 32 may be in tension to effect a compressing relation by launch packages 26, 28 against each other. Such a compressing abutting relation between launch packages 26, 28 may improve stability of each of launch packages 26, 28 during launch.

Additional strap members 36, 38 may be employed straddling junctures 29, 31 when length L is of sufficient magnitude to indicate that additional stability may be required for payload 25. More than two additional strap members may be required (not shown in FIG. 3) if length L is of sufficient magnitude to indicate that more such additional strap members may be useful. Additional strap members 36, 38 may be in tension to effect a compressing relation by launch packages 26, 28 against each other.

Release modules 37, 39, 40, 42 may be provided for effecting selective release of strap members 30, 32, 36, 38. Release modules 37, 39, 40, 42 may be embodied in any release mechanism desired such as, by way of example and not by way of limitation, explosive cutting modules, thermal cutting modules, acid cutting modules or another mechanism for severing strap members 30, 32, 36, 38. Release modules 37, 39, 40, 42 may be remotely controlled as from a launch base on earth, may be released by a timed mechanism or may be released by another control mechanism such as, by way of example and not by way of limitation, exposure of release modules 37, 39, 40, 42 to heat, to pressure or vacuum, to light or by another control mechanism.

An aerodynamic profile for launch packages 26, 28 is not an important consideration during launch because such an aerodynamic profile may be presented during launch by nose fairing structure 22 (see FIG. 2). An aerodynamic profile for launch packages 26, 28 is not an important consideration during orbit after launch because space is a substantial vacuum in which aerodynamic considerations are not of significant importance.

Figure 4:
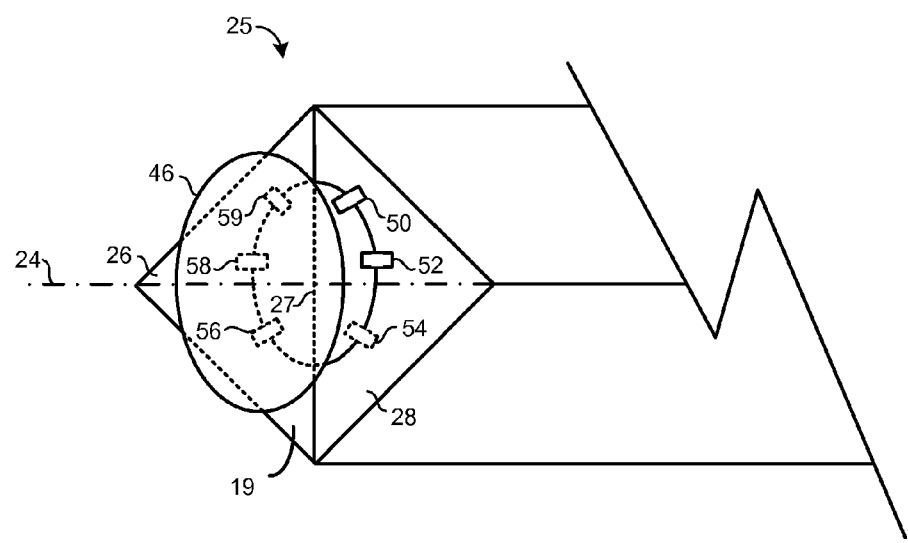
FIG. 4 is a schematic diagram illustrating further details relating to the trailing end of a two-unit payload configured according to the present disclosure.

FIG. 4 is a schematic diagram illustrating further details relating to the trailing end of a two-unit payload configured according to the present disclosure. In FIG. 4, payload 25 is viewed from trailing end 21 and may include launch packages 26, 28 arranged substantially adjacent to axis 24 in a side-by-side generally abreast orientation in a substantially facing relation at interface 27. A launch vehicle adapter 46 may be provided to effect a solid interface between payload 25 and a launch vehicle (not shown in FIG. 4). Launch vehicle adapter 46 may be affixed with payload 25 using a plurality of strap members 50, 52, 54, 56, 58, 59 interacting with launch vehicle adapter 46 and one of launch packages 26, 28 to abuttingly hold launch packages 26, 28 in a substantially facing relation at interface 27. Release modules similar to release modules 37, 39, 40, 42 (FIG. 3) may be provided for effecting selective release of strap members 50, 52, 54, 56, 58, 59. Release modules are not illustrated in FIG. 4 to avoid cluttering FIG. 4.

Carrying out release of strap members 30, 32, 36, 38 (FIG. 3) and strap members 50, 52, 54, 56, 58, 59 in a predetermined timed sequence may permit orderly release of respective payloads 26, 28 for orbit at different release loci and in different release attitudes.

Figure 5:
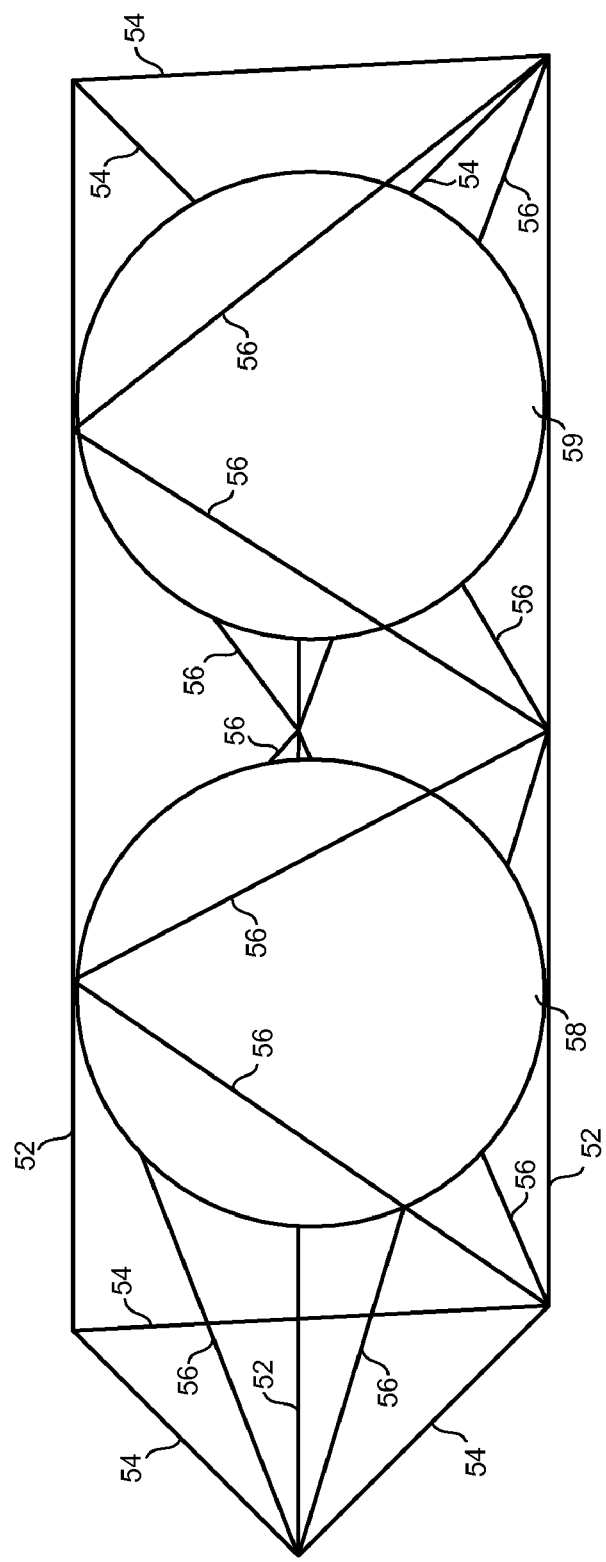
FIG. 5 is a schematic diagram illustrating a representative propulsion module configured according to the present disclosure.

FIG. 5 is a schematic diagram illustrating a representative propulsion module configured according to the present disclosure. In FIG. 5, a propulsion module 50 may be included in one of launch packages 26, 28. Propulsion module 50 may be configured using a girder-type construction employing a plurality of longitudinal tube members 52 supported by end tube members 54. Tube members are illustrated by way of example and not by way of limitation. Other cross-sectional shapes within the contemplation of those skilled in the art of structural design may be employed for tube members 54. A plurality of bracing tube members 56 joining longitudinal tube members 52 may add support to the structure of propulsion module 50 in a manner known to those skilled in the art of girder-type or truss-type construction. Fuel containers 58, 59 may be appropriately proportioned to effect a captive anchoring of fuel containers 58, 59 substantially within propulsion module 50.

Figure 6:
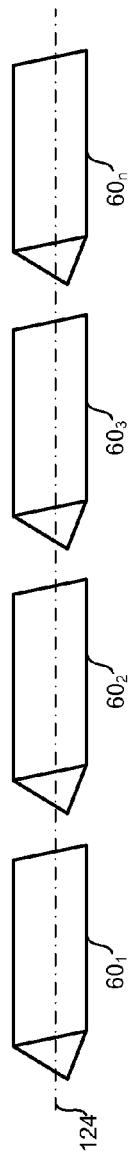
FIG. 6 is a schematic exploded diagram illustrating assembly of a plurality of a first embodiment of package elements into a launch package.

FIG. 6 is a schematic exploded diagram illustrating assembly of a plurality of a first embodiment of package elements into a launch package. In FIG. 6, launch package 126 includes package elements $60_1$, $60_2$, $60_3$, $60_n$ having a generally triangular cross section in planes perpendicular with an axis 124. The indicator "n" is employed to signify that there can be any number of package elements in launch package 126. The inclusion of four package elements in FIG. 6 is illustrative only and does not constitute any limitation regarding the number of package elements that may be included in a launch package configured according to the teachings of the present disclosure. Each package element $60_n$ may be configured as a respective operational module. By way of example and not by way of limitation, package elements $60_1$, $60_2$ may be configured as payload modules, package element $60_3$ may be configured as a power supply module and package element $60_n$ may be configured as a propulsion module similar to propulsion module 50 (FIG. 5).

Package elements $60_n$ may be specified by a launch services provider to customers in terms of predetermined dimensions. A launch services provider may offer a customer a reduced cost for launching a payload that can be configured within the predetermined parameters so as to permit the launch service provider to "piggy back" a plurality of launches for different customers on a single launch vehicle.

Figure 7:
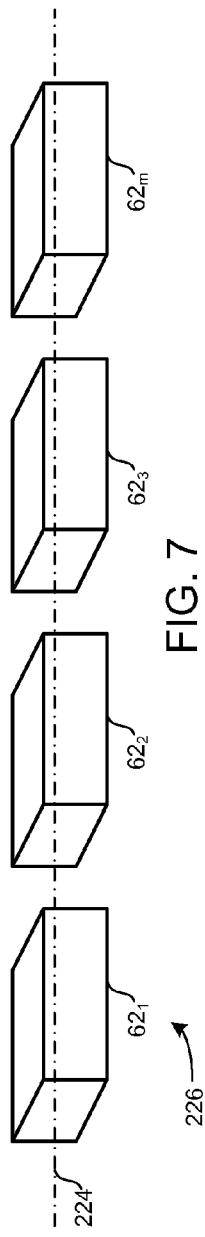
FIG. 7 is a schematic exploded diagram illustrating assembly of a plurality of a second embodiment of package elements into a launch package.

FIG. 7 is a schematic exploded diagram illustrating assembly of a plurality of a second embodiment of package elements into a launch package. In FIG. 7, launch package 126 includes package elements 62$_1$, 62$_2$, 62$_3$, 62$_m$ having a generally rectangular cross section in planes perpendicular with an axis 224. The indicator "m" is employed to signify that there can be any number of package elements in launch package 226. The inclusion of four package elements in FIG. 7 is illustrative only and does not constitute any limitation regarding the number of package elements that may be included in a launch package configured according to the teachings of the present disclosure. Each package element 62$_n$ may be configured as a respective operational module. By way of example and not by way of limitation, package elements 62$_1$, 62$_2$ may be configured as payload modules, package element 62$_3$ may be configured as a power supply module and package element 62$_n$ may be configured as a propulsion module similar to propulsion module 50 (FIG. 5).

Package elements 62$_n$ may be specified by a launch services provider to customers in terms of predetermined dimensions. A launch services provider may offer a customer a reduced cost for launching a payload that can be configured within the predetermined parameters so as to permit the launch service provider to "piggy back" a plurality of launches for different customers on a single launch vehicle.

Figure 8:
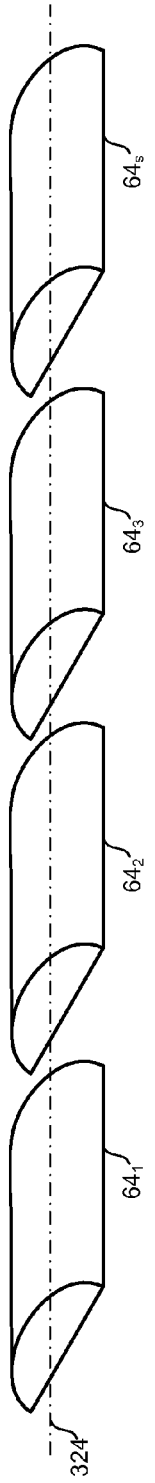
FIG. 8 is a schematic exploded diagram illustrating assembly of a plurality of a third embodiment of package elements into a launch package.

FIG. 8 is a schematic exploded diagram illustrating assembly of a plurality of a third embodiment of package elements into a launch package. In FIG. 8, launch package 326 includes package elements 64$_1$, 64$_2$, 64$_3$, 64$_s$ having a generally semi-cylindrical cross section in planes perpendicular with an axis 324. The indicator "s" is employed to signify that there can be any number of package elements in launch package 326. The inclusion of four package elements in FIG. 8 is illustrative only and does not constitute any limitation regarding the number of package elements that may be included in a launch package configured according to the teachings of the present disclosure. Each package element 64$_n$ may be configured as a respective operational module. By way of example and not by way of limitation, package elements 64$_1$, 64$_2$ may be configured as payload modules, package element 64$_3$ may be configured as a power supply module and package element 64$_n$ may be configured as a propulsion module similar to propulsion module 50 (FIG. 5).

Package elements 64$_n$ may be specified by a launch services provider to customers in terms of predetermined dimensions. A launch services provider may offer a customer a reduced cost for launching a payload that can be configured within the predetermined parameters so as to permit the launch service provider to "piggy back" a plurality of launches for different customers on a single launch vehicle.

Figure 9:
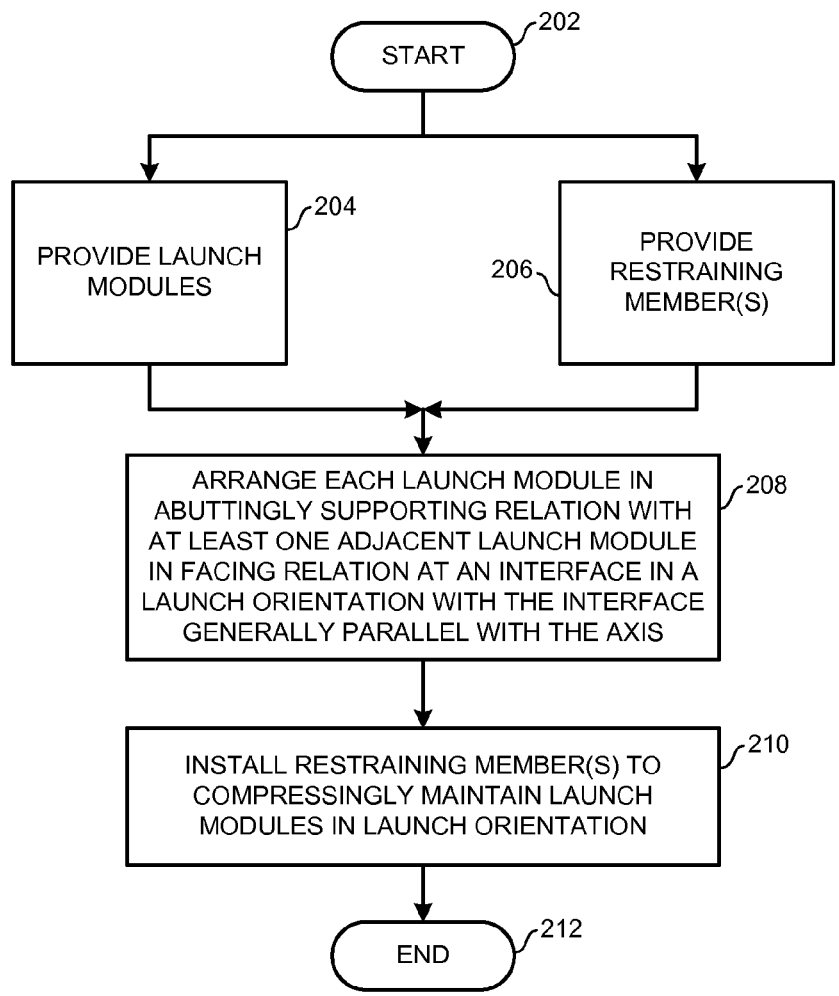
FIG. 9 is a flow chart illustrating the method of the present disclosure.

FIG. 9 is a flow chart illustrating the method of the present disclosure. In FIG. 9, a method 200 for deploying a plurality of independent payloads with a launch vehicle begins at a START locus 202. The launch vehicle may be longitudinally oriented about an axis. Method 200 continues with, in no particular order: (1) providing a plurality of launch modules, as indicated by a block 204 and (2) providing at least one restraining member, as indicated by a block 206. Each respective launch module of the plurality of launch modules includes a plurality of package elements. A respective predetermined set of package elements of the plurality of package elements comprises a respective payload of the plurality of payloads.

Method 200 continues with arranging each respective launch module of the plurality of launch modules in an abuttingly supporting relation with at least one adjacent the launch module in a facing relation at an interface in a launch orientation, as indicated by a block 208. The interface is generally parallel with the axis.

Method 200 continues with installing the at least one restraining member for cooperating with the plurality of launch modules to effect compressingly maintaining the plurality of launch modules in the launch orientation, as indicated by a block 210. Method 200 terminates at an END locus 212.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

I claim:

1. A system for arranging a payload for launching deployment into space using a single launch vehicle; the system comprising: a plurality of launch packages substantially symmetrically oriented in a launch orientation about a longitudinal axis; each said launch package abutting at an interface with an adjacent said launch package; each said launch package and each said interface being generally oriented about a plane containing said longitudinal axis; each said interface substantially intersecting said longitudinal axis in said launch orientation; and a plurality of restraining units oriented to effect holding said plurality of launch packages in said abutting relation; wherein said plurality of restraining units comprises embodying at least one strap unit; said at least one strap unit effecting said holding by engaging adjacent said launch packages.

2. A system as recited in claim 1 wherein said at least one strap unit includes a release module configured for selective release of said at least one strap unit.

3. A system as recited in claim 1 wherein each said launch package includes a plurality of package elements; each package element comprising an operational module of a respective said launch package; said plurality of package elements being coupled for operation in support of said respective launch package.

4. A system as recited in claim 3 wherein each said package element is a standardized operational module occupying a volume having predetermined dimensions.

5. A system as recited in claim 4 wherein said operational module is at least one of a power component, a propulsion component and a payload component.

6. A system for deploying a plurality of independent payloads with a launch vehicle; said launch vehicle being longitudinally oriented about an axis; the system comprising: a plurality of launch packages; each launch package including a plurality of package elements; a predetermined set of package elements of said plurality of package elements comprising a respective payload of said plurality of payloads; each launch package being situated in an abuttingly supporting relation with at least one adjacent said launch package in an abutting relation at an interface in a launch orientation; said interface substantially intersecting said axis; at least one strap unit cooperating with said launch package and said at least one adjacent launch package to effect compressingly maintaining said launch package and said at least one adjacent launch package in said launch orientation.

7. A system as recited in claim 6 wherein said at least one strap unit effects said compressingly maintaining by engaging adjacent said launch package and said at least one adjacent launch package on opposing sides of said interface.

8. A system as recited in claim 7 wherein said at least one strap unit includes a release module configured for selective release of said at least one strap unit.

9. A system as recited in claim 8 wherein each said package element is a standardized operational module occupying a volume having predetermined dimensions.

10. A system as recited in claim 9 wherein each said standardized operational module is at least one of a power component, a propulsion component and a payload component.

11. A system as recited in claim 6 wherein each said package element is a standardized operational module occupying a volume having predetermined dimensions.

12. A system as recited in claim 11 wherein each said standardized operational module is at least one of a power component, a propulsion component and a payload component.

13. A method for launchingly deploying a plurality of independent payloads into space with a launch vehicle; said launch vehicle being longitudinally oriented about an axis; the method comprising:
   (a) in no particular order:
       (1) providing a plurality of launch packages; each launch package including a plurality of package elements; a predetermined set of package elements comprising a payload; and
       (2) providing at least one strap unit;
   (b) arranging each launch package in an abuttingly supporting relation with at least one adjacent said launch package in a facing relation at an interface in a launch orientation; said interface substantially intersecting said axis; and
   (c) installing said at least one strap unit for cooperating with said launch package and said at least one adjacent launch package to effect compressingly maintaining said launch package and said at least one adjacent launch package in said launch orientation.

14. A method as recited in claim 13 wherein said at least one strap unit effects said compressingly maintaining by engaging adjacent said launch packages on opposing sides of said interface.

15. A method as recited in claim 14 wherein each respective said package element is a standardized operational module of said launch package; each said standardized operational module having predetermined physical dimensions.

16. A method as recited in claim 15 wherein each said standardized operational module is at least one of a power component, a propulsion component and a payload component.

17. A system for arranging a plurality of payloads generally abreast for deployment using a single launch vehicle; the system comprising:
   (a) a plurality of launch packages; each launch package including at least one said payload; each said launch package being configured for a substantially facing relation at an interface with an adjacent said launch package; each said interface substantially intersecting a common longitudinal axis; and
   (b) a plurality of strap units engaging said plurality of launch packages to abuttingly hold said plurality of launch packages in said substantially facing relation.

18. A method for deploying a plurality of independent payloads generally abreast for travel with a launch vehicle; said launch vehicle being longitudinally oriented about an axis; the method comprising:
   (a) in no particular order:
       (1) providing a plurality of launch packages; each launch package including a plurality of package elements; a predetermined set of package elements comprising a payload; and
       (2) providing at least one strap unit;
   (b) arranging each launch module in an abuttingly supporting relation with at least one adjacent said launch package in a facing relation at an interface in a launch orientation; said interface substantially intersecting said axis; and
   (c) installing said at least one strap unit for engaging adjacent said launch packages to effect compressingly maintaining said plurality of launch packages in said launch orientation.

* * * * *